US006993966B2

(12) United States Patent
Stenmark

(10) Patent No.: US 6,993,966 B2
(45) Date of Patent: Feb. 7, 2006

(54) ADVANCED VOLUME GAUGING DEVICE

(76) Inventor: Lars Stenmark, Seglarvagen 10, Trosa (SE), S-619 91

( * ) Notice: Subject to any disclaimer, the term of this patent is extended or adjusted under 35 U.S.C. 154(b) by 37 days.

(21) Appl. No.: 10/479,988

(22) PCT Filed: Jun. 10, 2002

(86) PCT No.: PCT/SE02/01120

§ 371 (c)(1),
(2), (4) Date: Jun. 4, 2004

(87) PCT Pub. No.: WO02/101336

PCT Pub. Date: Dec. 19, 2002

(65) Prior Publication Data

US 2004/0231413 A1 Nov. 25, 2004

(30) Foreign Application Priority Data

Jun. 8, 2001 (SE) .............................. 0102037

(51) Int. Cl.
*G01F 17/00* (2006.01)

(52) U.S. Cl. ....................... 73/290 B; 73/149
(58) Field of Classification Search ............... 73/290 B, 73/149
See application file for complete search history.

(56) References Cited

U.S. PATENT DOCUMENTS

| 3,895,519 A | | 7/1975 | Bouchy et al. ............... 73/149 |
| 4,840,064 A | * | 6/1989 | Fudim ..................... 73/290 B |
| 4,987,775 A | | 1/1991 | Chobotov .................... 73/149 |
| 5,531,111 A | | 7/1996 | Okamoto et al. ............. 73/149 |
| 5,880,356 A | | 3/1999 | Delepierre-Massue et al. 73/37 |

FOREIGN PATENT DOCUMENTS

FR 2682185 4/1993

* cited by examiner

*Primary Examiner*—Hezron Williams
*Assistant Examiner*—Tamiko Bellamy
(74) *Attorney, Agent, or Firm*—Young & Thompson

(57) ABSTRACT

A new high precision volume gauging system for measuring the volume of a propellant VL enclosed at a first pressure PU within a propellant tank (40) of a volume VT. The improved precision compared with prior art is achieved in that it comprises a high precision pressure sensor (90) which is comprised of a reference chamber (115) that is connected to the propellant tank (40) by a communication line (140), a valve (150) for controlling the gas flow through the line (140), and a high precision differential pressure sensor (95) that is arranged to record the pressure difference between the reference chamber (115) and the propellant tank (40) to which it is connected through a communication line (130).

7 Claims, 5 Drawing Sheets

ADVANCED VOLUME GAUGING DEVICE

FIELD OF THE INVENTION

The present invention relates to an advanced volume gauging device. More specifically, the invention relates to a high precision miniaturized volume gauging device.

PRIOR ART

It is a well-known problem to measure the amount of remaining propellant in a tank in zero gravity environments. The reason is that in the absence of gravity, the liquid will float around freely inside the tank. Significant benefits can be obtained by developing reliable volume gauging systems with better accuracy.

For a communication satellite in geosynchronous orbit, only 10% uncertainly in the estimation of remaining propellant, which is not uncommon, can lead to that more than a year of the satellite life is lost. This leads to a very high cost penalty due to the estimate error, keeping in mind the huge cost for a communication satellite.

In U.S. Pat. No. 4,987,775 Chobotov et al disclose a volume gauging system based on thermodynamic principles. This system 10 is shown in FIG. 1, and it includes a pressurisation tank 20 of volume $V_p$. The tank 20 includes a pressurisation gas at pressure $P_p$ and temperature $T_p$. The system 10 further includes a propellant tank 40 of volume $V_T$. The tank 40 includes a generally liquid propellant occupying a volume $V_L$. The portion of the tank 40 unoccupied by the liquid phase of the propellant has an ullage volume $V_u$, a pressure $P_u$ and a temperature $T_u$. The tanks 20 and 40 are interconnected by a gas line 50. Gas flow through the line 50 is controlled by an injection valve 60. Additionally, the pressure $P_p$ within the tank 20 is monitored by a first absolute pressure transducer 65 in communication therewith. Similarly, a second absolute pressure transducer 70 monitors the pressure $P_u$ within the ullage volume $V_u$ of the tank 40. The temperatures $T_p$ and $T_u$ of the tanks 20 and 40 are ascertained by temperature sensors (not shown) operatively coupled thereto.

The propellant measurement system 10 is adapted to determine the ullage volume $V_u$ of the tank 40 and thereby determine the volume of remaining propellant $V_L$ through the expression $V_L = V_T - V_u$. The ullage volume $V_u$ is determined in the following manner. First, the pressure $P_p$ is chosen to be larger than the pressure $P_u$ in order that the pressurisation gas within the tank 20 flows into the tank 40 upon opening of the valve 60. The valve 60 is opened until a suitably measurable increase occurs in the pressure $P_u$ within the chamber 40. The valve 60 is then closed and the changes in the pressures $P_p$ and $P_u$ are determined from the pressure transducers 65 and 70. The ullage volume $V_u$ may now be determined by noting that during the above process gas is conserved within the system 10. Accordingly, from fundamental thermodynamic equations assuming an isothermal process and that the propellant is incompressible:

$$\frac{P_p V_p}{T_p} + \frac{P_u V_u}{T_u} = \frac{(P_p - dP_p)V_p}{T_p} + \frac{(P_u + dP_u)V_u}{T_u} \quad [1]$$

where
$dP_p$=the change in $P_p$ as measured by the first pressure transducer 65.
$dP_u$=the change in $P_u$ as measured by the second pressure transducer 70.

After simple algebra, $$\frac{dP_p V_p}{T_p} = \frac{dP_u V_u}{T_u} \quad [2]$$

Hence, $$V_u = \frac{dP_p V_p T_u}{dP_u T_p} \quad [3]$$

From which the volume of propellant remaining in the tank 40 may be expressed as:

$$V_L = V_T - V_u = V_T - \frac{dP_p V_p T_u}{dP_u T_p} \quad [4]$$

To achieve results with high accuracy when the tank 40 is nearly empty, $dP_u$ has to be recorded with very high requirement on resolution over a pressure range from a few bars up to 22 bars. No commercially available pressure sensor meets the requirements. Among space qualified sensors, the performance of best sensors is far from the requirements. The traditional approach is to take a good sensor and then improve the performance with new signal conditioner electronics where the rapid technological progress permits new designs with higher performance. This approach will probably not work in this case, as error sources in the sensor internal design become dominant. The errors may be of several types, long term drift, linearity, hysteresis, etc. This indicates that an alternative sensor concept must be used, which is directly tailored for the $dP_u$ applications.

One possible way to accomplish such a sensor is described in JP 57035743, and shown in FIG. 2. This particular sensor 90 is intended for measuring small fluctuations in atmospheric pressure, and is constructed as follows. A space which has been surrounded by a first vessel 100 and a second vessel 110 is divided into two parts by a flexible film body 120, and a first chamber 105 and a reference chamber 115 are formed by the flexible film body 120 and the vessel 100, and the flexible film body 120 and the vessel 110, respectively. On the vessel 100 and the vessel 110 are provided communicating holes (or lines) 130, 140 by which the respective chambers 105, 115 communicate to the open air, and on the communicating hole 140 is provided an electromagnetic valve 150 for opening and closing between the reference chamber 115 and the open air. A pressure sensor 160 detects and measures pressure of a difference between the chamber 105 and 115 through the flexible film body 120. A measuring signal processing part 170 receives a signal which has been sent from the pressure sensor 160, converts it to a variation of pressure by means of signal processing, sends it out to a display recording part 180, also sends out an opening and closing indication signal to an opening and closing means driving part 190 whenever a variation of pressure attains to a set value, and instantaneously opens the electromagnetic valve 150. Generally, the concept of this sensor may be described as a differential pressure sensor 95 measuring a pressure difference between the closed reference chamber 115 and the surrounding atmosphere.

The sensor concept presented in JP 57035743 may be designed such that a huge increase in sensitivity (in a limited but selectable range) is achieved, compared to a conventional differential pressure sensor. A numerical example gives the following results. The pressure on the frontside and the backside will be absolutely equal if the valve 150 is open long enough. The pressure in reference chamber 115 should be within 0.1% of 22 bars if the tank pressure is 22 bars. Assume that the pressure sensor membrane 120 has 100-mbar sensitivity for a full-scale deflection and that the deflection may be measured with 0.1% accuracy. The end result is that with an absolute pressure of 22 bars a pressure change of 0.022 mbar can be detected. The resolution is $10^{-6}$, which is far beyond what can be achieved with any conventional pressure sensor today.

SUMMARY OF THE INVENTION

The present invention aims toward a self-contained miniaturized volume gauging device, which can be mounted on/inside, the tank wall. Such a device has three major advantages compared with existing systems. Firstly, the sample volume will have the same temperature as the tank volume, which relaxes the temperature measurement requirements. Secondly, the propellant tank walls provide additional radiation shielding for the integrated electronics. Thirdly, the proposed device will be both lighter and smaller compared with conventional systems. The device shall include the sample volume, gas injection system, super-high precision pressure sensor and electronics for control, signal conditioning and digital interface to the spacecraft.

An object of the present invention therefore is to provide a new miniaturized volume gauging system.

Another object of the present invention is to provide a new method for measuring the remaining fuel in a propellant tank using a dP pressure sensor.

These objects and other objects of the invention are achieved by the volume gauging device and the method as defined in the claims.

DETAILED DESCRIPTION OF THE INVENTION

Embodiments of the invention will now be described with reference to the figures in which members having the same function as in prior art will be given the same number.

Figure 1:
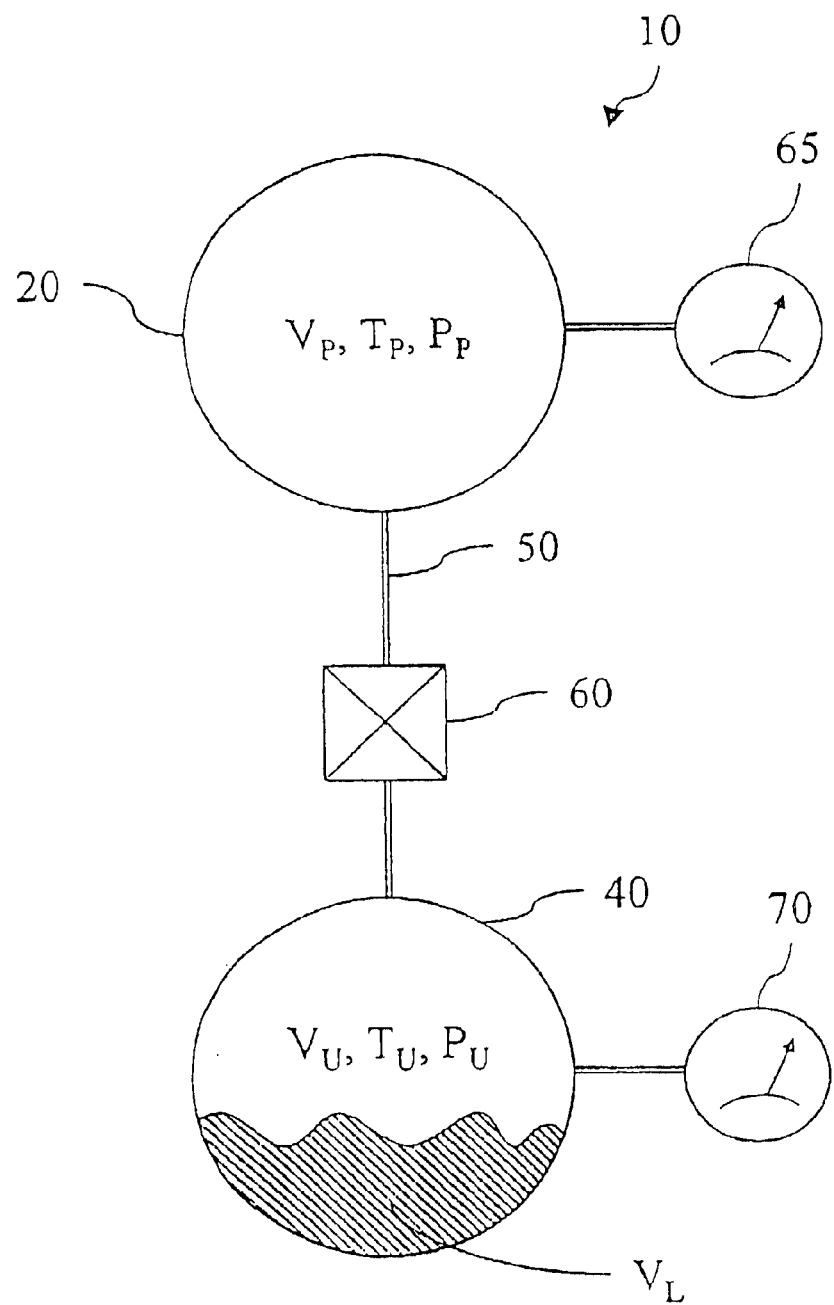
FIG. 1 schematically shows an existing propellant gauging system.
Figure 2:
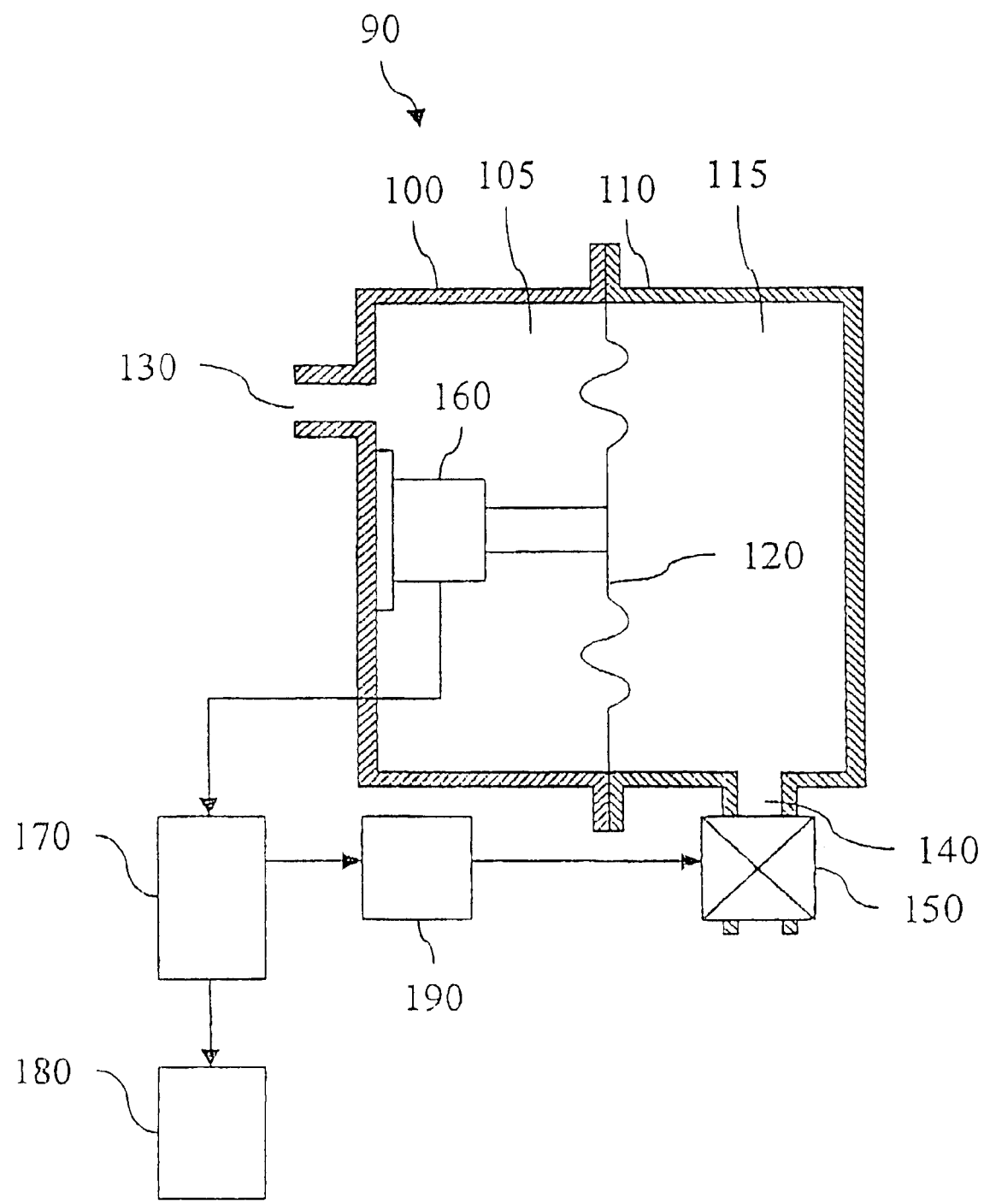
FIG. 2 shows an existing high precision pressure sensor.
Figure 3:
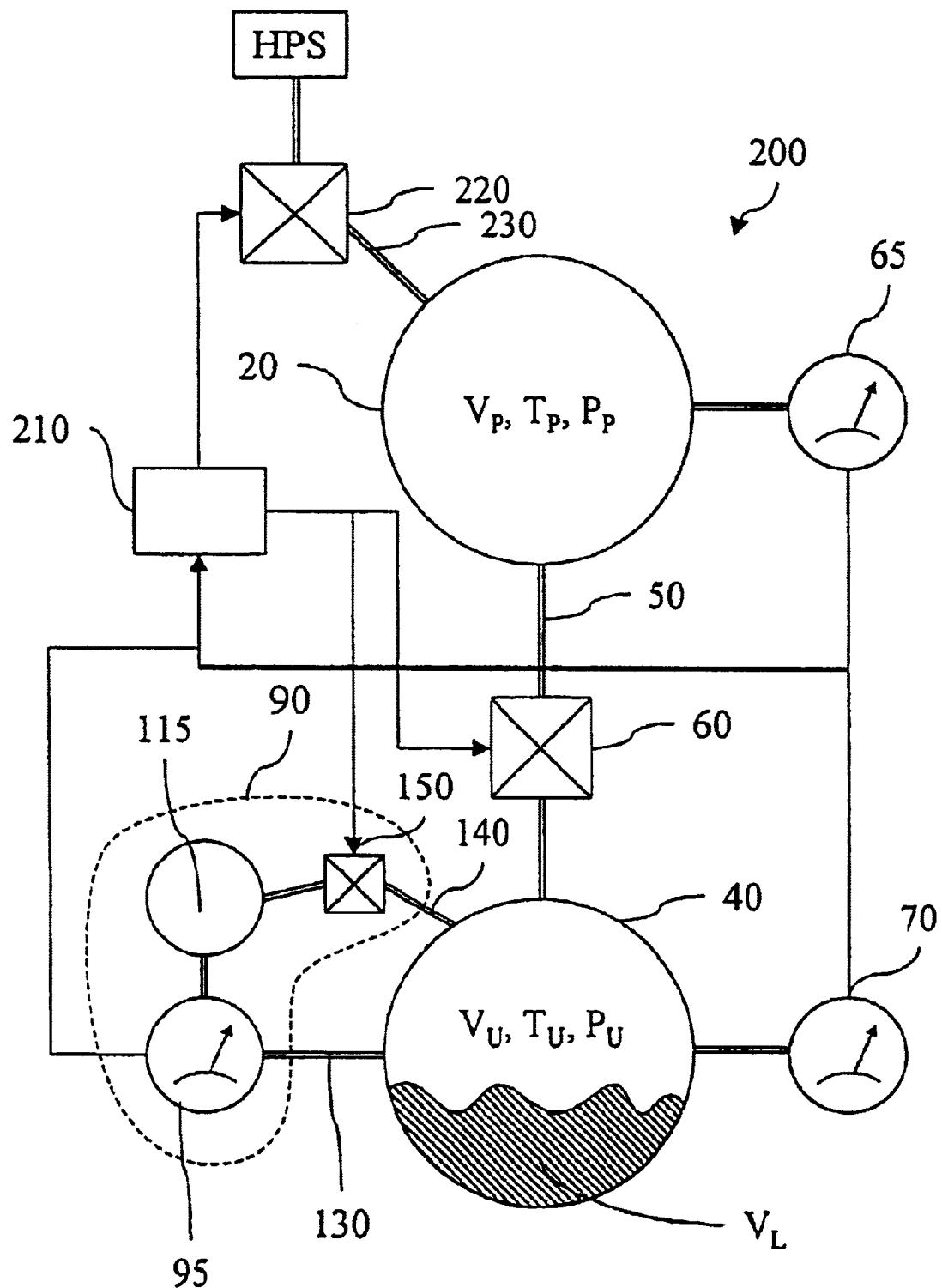
FIG. 3 schematically shows a propellant gauging system according to the present invention.

FIG. 3 shows a block diagram of one embodiment of the invention. The fuel gauging system 200 comprises all parts shown in FIG. 1, and one high precision pressure sensor 90 according to FIG. 2, which pressure sensor 90 is coupled to the propellant tank 40 by the communicating holes 130, 140. The system further comprises a processing/control unit 210 for calculating the volume of the remaining fuel VL and controlling the gauging cycle. A line 230 connects the pressurisation tank 20 with a high pressure source (HPS) and the loading of high pressure gas into the pressurisation tank 20 is controlled by a valve 220.

The system may further comprise filters to prevent liquids inside the gas system and temperature sensors for measuring the temperatures in the pressurisation tank 20 and the propellant tank 40. But as the present invention aims toward a miniaturized fuel gauging device, which can be mounted on/inside the tank wall, the gas in the pressurisation tank 20 will approximately have the same temperature as the gas in the propellant tank 40, whereby the temperature measurements may be omitted.

When a determination of remaining propellant shall be performed the following sequence is activated by the processing/control unit 210. Valve 220 is opened and the pressurisation tank 20 is filled with gas to a high pressure $(P_p)$, then the valve 220 is closed and the pressure transducer 65 registers the pressure Pp. At the same time absolute pressure $(P_u)$ is registered in the propellant tank 40 by the pressure transducer 75, and the valve 150 is closed such that the reference chamber 115 will remain at the pressure $P_u$. Thereafter the injection valve 60 is opened and the high pressure gas from the pressurisation tank 20 is injected into the propellant tank 40. The high precision pressure sensor 90 registers the resulting small increase of the absolute pressure $dP_u$ in the propellant tank 40, the injection valve 60 is closed and the processing/control unit 210 calculates the volume of the remaining propellant using equation [5] below. As the pressure in the pressurisation tank 20 now is equal to the pressure in the propellant tank 40, $dP_p$ in equation [4] may be replaced by $(P_p-(P_u+dP_u))$ whereby:

$$V_L = V_T - V_u = V_T - \frac{(P_p - (P_u + dP_u))V_p T_u}{dP_u T_p} \qquad [5]$$

When a volume gauging system is installed in/on a propellant tank, it will also replace the usual pressure measurements for tank monitoring. Thus, the pressure measurement system shall enable two kinds of pressure data, $dP_u$ pressure valves for volume gauging and absolute tank pressure for house-keeping Requirements on a volume gauging system may be:

| | |
|---|---|
| Tank volume: | 10-T.B.D. liter |
| $P_u$ measurements: | pressure range 2–22 bar |
| | resolution 0.01 bar |
| | accuracy 0.1% |
| $dP_u$ measurements: | diff. pressure range ±100 mbar |
| | resolution 0.1 mbar |
| | accuracy 0.1% with ±0.1 bar range |
| | response time <100 mS |
| | sampling rate 5 s/s |
| $P_p$ measurements: | pressure range 10–200 bar |
| | resolution 0.1 bar |
| | accuracy 0.1% |

The requirements on fast response time and sampling rate originates from the fact that the tank pressure value are of significant importance for the accuracy of the $dP_u$ measurement after a gas sample injection. The pressure conditions are not in steady state conditions.

Figure 4:
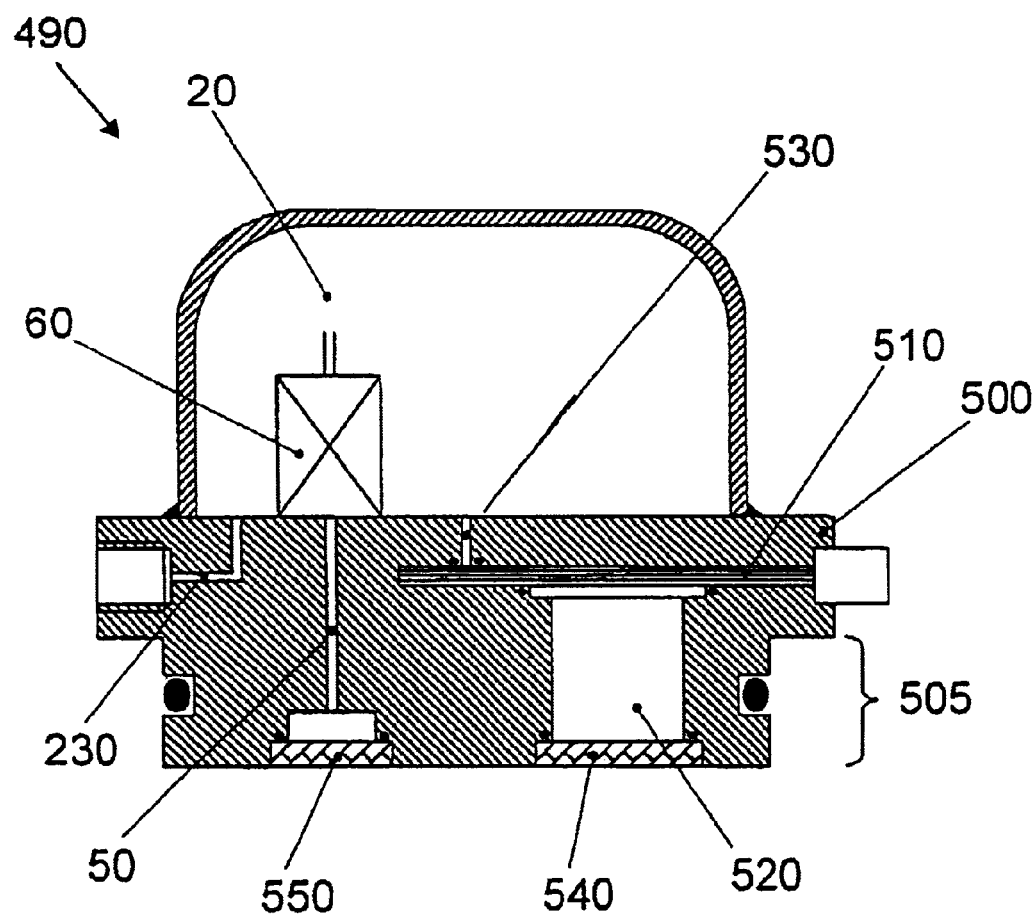
FIG. 4 shows one embodiment of the miniaturized fuel gauging device of the invention.

FIG. 4 shows an exemplary embodiment of a self-contained miniaturized volume gauging device 490, which is intended to be mounted directly on the tank wall. This embodiment comprises a main body 500 on which a pressurisation tank 20 is arranged.

Figure 5:
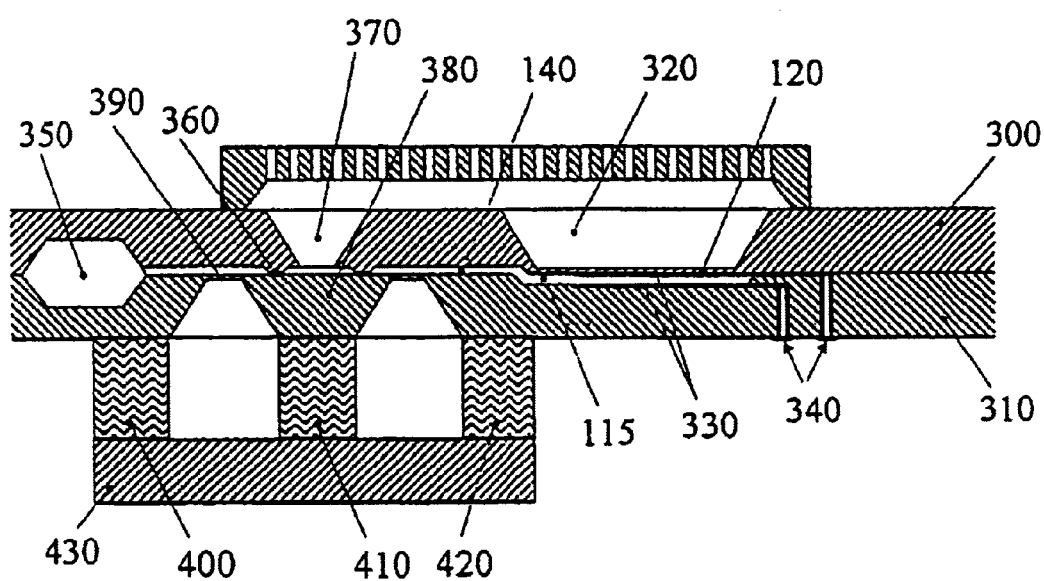
FIG. 5 shows one embodiment of a michromechanical dP sensor according to one embodiment of the invention.

The main body 500 comprises a communication portion 505 that is arranged to mate a hole in the wall of a propellant tank 40. An injection valve 60 is mounted on the main body 500 inside the pressurisation tank 20. A first line 230 extends from an outer surface of the main body 500 to the pressurisation tank 20, through which first line 230 loading of high-pressure gas into the pressurisation tank 20 is performed. A high-pressure valve 220 (not shown in the figure)

is in this embodiment arranged separately from the volume-gauging device 490 and connected to the line 230. A second gas line 50 extends through the main body 500 terminating at one end in the propellant tank 40 and at the other end at the injection valve 60. A micromechanical pressure sensor unit 510 is arranged in the main body 500. The pressure sensor unit 510 comprises one $P_u$ sensor, one $P_p$ sensor and one $dP_u$ sensor. The $P_u$ sensor and the $dP_u$ sensor communicates with the propellant tank 40 via a third gas line 520, and the $P_p$ sensor communicates with the pressurisation tank 20 via a fourth gas line 530. An electrical connector for connecting the pressure sensor unit 510 and the injection valve 60 to an external control unit (not shown), is arranged on the side of the main body 500. To prevent propellant from entering the lines 520 and 50, they are each provided with a protection filter 540 and 550 respectively. FIG. 5 further shows a number of sealing rings that prevent gas or propellant leakage in the system.

In addition to the vastly increased sensitivity, the proposed self-contained miniaturized volume gauging device 490 is considerably smaller and lighter than existing systems built up from discrete components. However, for microsatellites and the like, even smaller devices are needed, and as the propellant tank 40 in such systems is much smaller, the pressurisation tank 20 may be extremely small, a self-contained all micromechanical volume gauging device may be applicable.

A practical realisation of a micromechanical dP-sensor which may be used in the above embodiments is shown in FIG. 5. The $P_u$ sensor and the $P_p$ sensor of the micromechanical pressure sensor unit 510 are not shown here, as they may be considered trivial to one skilled in art. This dP-sensor is based on bonded micromachined wafers. The material is most likely silicon but other more corrosion resistant materials such as quartz or silicon carbide can also be used. The device works as follows. Wafer A 300 and wafer B 310 form the pressure sensor and the valve elements. A large cavity 320 is formed on wafer A 300 by suitable etching methods. The bottom of the cavity becomes a flexible membrane 120. Two metal planes 330 or electrodes between wafer A 300 and B 310 act as a capacitor where the capacitance changes when the membrane bends. The electrodes can be accessed via two through-plated holes 340. This is the pressure sensor part.

A reference chamber 115 is connected to the valve through a small channel 140. The volume of the reference chamber 115 is much larger than expected as it also is connected to a buffer volume 350. This volume has two good effects on the system. It reduces the sensitivity for valve leakage during the measurement period and also the effects of the flexible membrane 120 deflection which otherwise could cause a small increase of the locked reference pressure. A valve seat 360 is formed in wafer A 300 through wet etching of a shallow cavity with a ringshaped ridge. The gas entrance is through a wet etched through hole 370. The hole is etched from the outside. A valve cap 380 is formed in wafer B 310, it is a square shaped block suspended all around by a thin flexible membrane 390. The valve cap 380 may be moved against or from the valve seat by changing the length of valve actuators 400, 410, 420. The actuators 400, 410, 420 may be piezoelectric elements where the total length can be changed by a control voltage. The valve cap 380 opens when the central actuator 410 contracts or when the surrounding actuators 400, 420 elongate. The central actuator 410 is mechanically connected to the surrounding by use of a third silicon wafer 430.

A fourth silicon wafer 440 with a filter structure protects the fragile sensor membrane 120 from liquids or particles.

What is claimed is:

1. A method of measuring the volume of a propellant $V_L$ enclosed at a first pressure $P_U$ within a first tank of a first volume $V_T$, where the tank volume $V_T$ is equal to the volume of the propellant $V_L$ plus an ullage volume $V_U$, said method comprising the steps of:
    (a) enclosing a pressurization gas of a second volume $V_p$ in a second tank at a second pressure $P_p$, said second pressure $P_p$ being greater than said first pressure $P_U$;
    (b) opening a connection between the ullage volume in the first tank and a reference chamber such that the reference pressure $P_r$ will be essentially equal to $P_U$;
    (c) closing the connection between the ullage volume in the first tank and a reference chamber such that the reference pressure $P_r$ will be independent of $P_U$;
    (d) opening a connection between the first tank and the second tank;
    (e) measuring the resulting pressure difference $dP_U$ between the ullage volume and the reference chamber using a differential pressure (dP) sensor of high accuracy;
    (f) calculating the ullage volume $V_U$ of said first tank in accordance with the following equation:

$$V_u = \frac{(P_p - (P_u + dP_u))V_p}{dP_u};$$

and
    (g) subtracting said ullage volume $V_U$ from said first $V_T$ volume to determine said propellant volume $V_L$.

2. The method of claim 1, characterised in that it comprises the step of:
    measuring the temperatures of said ullage volume $T_U$ and said pressurization gas $T_p$, and that the step of calculating the ullage volume $V_U$ of said first tank is performed in accordance with the following equation:

$$V_u = \frac{(P_p - (P_u + dP_u))V_p T_u}{dP_u T_p}.$$

3. High precision volume gauging system for measuring the volume of a propellant $V_L$ enclosed at a first pressure $P_U$ within a propellant tank (40) of a volume $V_T$, said system comprising a pressurisation tank (20) that is connected to a high pressure source by a high pressure gas line (230) and to the propellant tank (40) by a line (50), an injection valve (60) controlling the gas flow through the line (50), a first absolute pressure transducer (65) for monitoring the pressure $P_p$ within the tank (20), and a second absolute pressure transducer (70) monitoring the pressure $P_u$ within the ullage volume $V_u$ of the tank (40), wherein the system further comprises a high precision pressure sensor (90) which is comprised of a reference chamber (115) that is connected to the propellant tank (40) by a communication line (140), a valve (150) for controlling the gas flow through the line (140), and a high precision differential pressure sensor (95) that is arranged to record the pressure difference between the reference chamber (115) and the propellant tank (40) to which it is connected through a communication line (130).

4. High precision volume gauging system according to claim 3, provided as a self-contained miniaturized volume gauging device (490) that is arranged to be mounted directly on the wall of the propellant tank (40).

5. Self-contained miniaturized volume gauging device (490) according to claim 4, wherein the high precision pressure sensor (90) is provided as a micromechanical pressure sensor unit (510).

6. Self-contained miniaturized volume gauging device (490) according to claim 5, wherein the micromechanical pressure sensor unit (510) further comprises the first absolute pressure transducer (65), the second absolute pressure transducer (70).

7. High precision micromechanical pressure sensor unit (510) according to claim 5, comprised of a first wafer A (300) which is bonded to the top surface of a second wafer B (310), wherein the differential pressure sensor (95) is formed in that, a deep cavity (320) is formed in the top surface of wafer A (300) such that a flexible membrane (120) is formed by bottom of the cavity (320) and the bottom surface of wafer A (300), a reference chamber (115) is formed in the wafer B (310) beneath the flexible membrane (120), metal electrodes (330) are arranged at the bottom surface of the flexible membrane (120) and the bottom surface of the reference chamber (115) such that they act as a capacitor where the capacitance changes when the membrane bends, wherein the valve (150) is comprised of a valve seat (360) in the shape of a ring-shaped ridge formed in the bottom surface of wafer A 300, a gas entrance (370) located inside the valve seat (360), a valve cap (380) formed in the top surface of wafer B 310 as a rigid cap portion surrounded by a thin flexible membrane (390), the valve cap (380) is closed and opened by a piezoelectric actuator arrangement (400, 410, 420), and wherein the reference chamber (115) is connected to the valve through a small channel (140).

\* \* \* \* \*